United States Patent [19]

Holzer

[11] Patent Number: 4,901,779

[45] Date of Patent: Feb. 20, 1990

[54] SAFETY TIRE ASSEMBLY FOR VEHICLE

[76] Inventor: Walter Holzer, Drosteweg 19, Meersburg, Fed. Rep. of Germany, 7758

[21] Appl. No.: 207,175

[22] Filed: Jun. 15, 1988

[30] Foreign Application Priority Data

Jun. 16, 1987 [DE] Fed. Rep. of Germany ....... 3720022

[51] Int. Cl.⁴ .............................................. B60C 17/04
[52] U.S. Cl. ...................................... 152/158; 152/520
[58] Field of Search ............... 152/516, 520, 158, 517, 152/518; 301/39 T

[56] References Cited

U.S. PATENT DOCUMENTS

| 3,180,391 | 4/1965 | Lindley | 152/158 |
| 3,949,796 | 4/1976 | Bartos | 152/158 |
| 4,258,767 | 3/1981 | Wilde | 152/520 |

Primary Examiner—Michael W. Ball
Assistant Examiner—Gregory J. Wilber
Attorney, Agent, or Firm—Paul H. Gallagher

[57] ABSTRACT

A safety tire for vehicles consists of a rim and an air-filled elastic tire concentrically fastened thereto. In order to prevent a premature destruction of this tire in operation, a circular support body is provided, rotatably supported on the rim inside the tire.

7 Claims, 2 Drawing Sheets

SAFETY TIRE ASSEMBLY FOR VEHICLE

Great and urgent efforts to increase the safety of air tires for vehicles have been exerted, since with air loss, not only is the tire destroyed, but also control over the vehicle is at least partially lost and human life endangered.

A recent attempt to achieve a reliable and secure tire system was presented under the name "CTS" (Conti-Tire-System). In that case, the rim has a corresponding support surface, which keeps the tire drivable even with air loss.

That method is only conditionally usable, and possesses essential technical and commercial disadvantages.

The running surface of the tire constituted by the outer surface of the thread element, has a circumference corresponding to the outermost diameter of the tire. On the other hand, the support surface of the rim has a diameter that is essentially smaller. With air loss, two surfaces with different circumferences substantially lie on each other, namely, the support surface and the inner surface of the tread element, and with each revolution there is a corresponding slippage. Consequently, wear and tear through friction and heating occurs, which leads to destruction of the tire.

Also in the commercial aspect, that method is only conditionally employable, since none of the present rims and tire models can be provided with such a system. New rims and tires are always required.

According to the present invention there is provided on the rim inside the tire a circular support body, which is rotatably supported on and relative to the periphery of the rim.

The outer radius of the support body, on which the tire can rest upon loss of air, is according to the invention, at least as small as the smallest radius of the inner surface of the tire, when the tire is inflated, and thereby, when the tire is so inflated, the support body never touches the outer wall and in no way affects the driving function of the tire.

An advantageous feature of the invention consists in supporting the support body directly in the periphery of the rim. The rim is so constructed that the support body can be mounted thereon with change to the rim. The support body is mounted on the rim with substantial play, eliminating rolling of the support body with the rim.

In order to avoid unusual inertia that would result from a great amount of play between the rim and support body, a resilient means is interposed between those elements.

The safety tire works especially well when the support body and the rim are arranged in the form of an outer and inner ring of a ball bearing, for example, utilizing balls or rollers.

Since the support body, in a deflated tire, is driven from the tire circumference, and "overtakes" or outruns the rim, the support body must be able to turn uninhibited. On the other hand it is advantageous to have driving coupling only in the direction of the intended power transmission, to maintain the driving function of the vehicle.

In using conventional tires, a support body must be mounted simultaneously with the tire, on the rim. In order to simplify such assembly it is advised to form the support body of two or more segments.

The material used, and the construction of the support body in the present safety tire, are such as to avoid a great amount of inertia. It is here therefore preferred that light metal and/or synthetic material be used, and weight reducing notches be provided.

A further improvement consists in introducing an elastic covering, for example of rubber, on the periphery of the support body, whereby to produce not only a muffling of the vibrations, but also a better friction adhesion between the inner surface of the tire and the elastic covering. In consequence, the slippage occurs not between these parts, but rather, as intended, between the rim and support body. Also this measure increases the preservation of the tire.

Instead of the ball bearing feature, a slide bearing may be utilized wherein, at the points of contact between the rim and the support body, one or two sided slide coverings (18), (19), are provided with minor friction coefficient as presented in FIG. 3. Alternatively, both parts may be of materials having small friction coefficient.

In the FIGS. 1-6, several construction examples are presented, pointing up the great advantages of the invention. The simplified sketches are not to be interpreted as restrictive, but rather to show ways in a broad scope of known construction for embodying the invention.

Figures 1, 2:
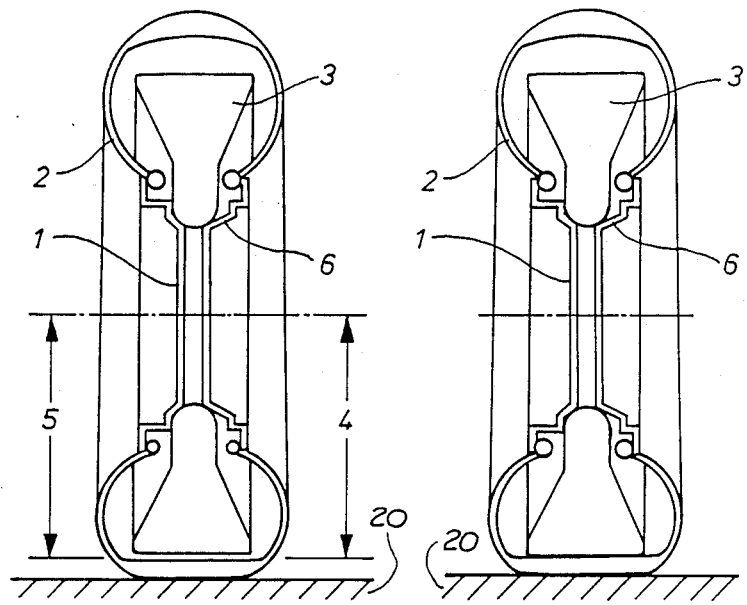
FIG. 1 is an axial sectional view of a safety tire assembly embodying the invention, ininflated condition and resting on a supporting surface.
FIG. 2 is a view similar to FIG. 1, but in which the tire is at least partially deflated.

FIG. 1 shows a tire (2) mounted on the rim (1) and resting on the ground (20). In the tire (2) is symmetrically built rotatable support body (3) supported on the rim (1). It has a radius (4) which is smaller than the smallest inner radius (5) of the tire (2) in inflated condition.

FIG. 2 shows the same tire (2), but after at least a certain amount of air has been lost. In this situation the support body (3) engages the inside surface of the tread of the tire (2) and it rolls thereon. Since the radii (4), (5), differ in dimension, the support body (3) makes more than one complete turn with a revolution of the tire, and it will in a fashion, with the same rpm as the tire, overtake the rotating rim (1), on which the tire is securely mounted. This is made possible by the fact that the support body (3) is rotatably supported on the rim and in the outer channel (6).

Figure 3:
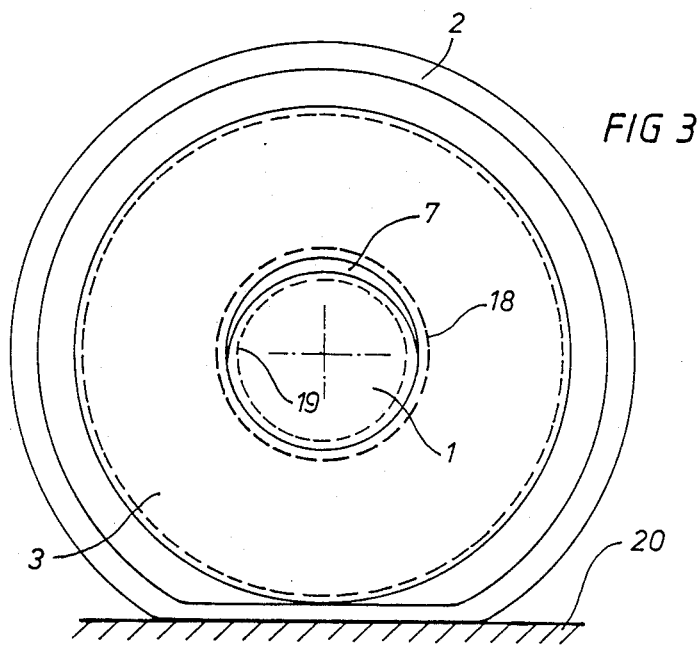
FIG. 3 is a side view of the safety tire assembly as shown in FIG. 3.

The simple bearing relationship provided by the outer channel (6) of the rim (1) has great importance. There is a great advantage in the relatively great play (7) provided as shown in FIG. 3. Accordingly a larger tolerance area is provided to accommodate variations in items put out by different manufacturers. The overrunning of the support body (3) on the rim (1) is under certain conditions advantageous even with respect to uneveness of the upper surface of the rim.

Figure 4:
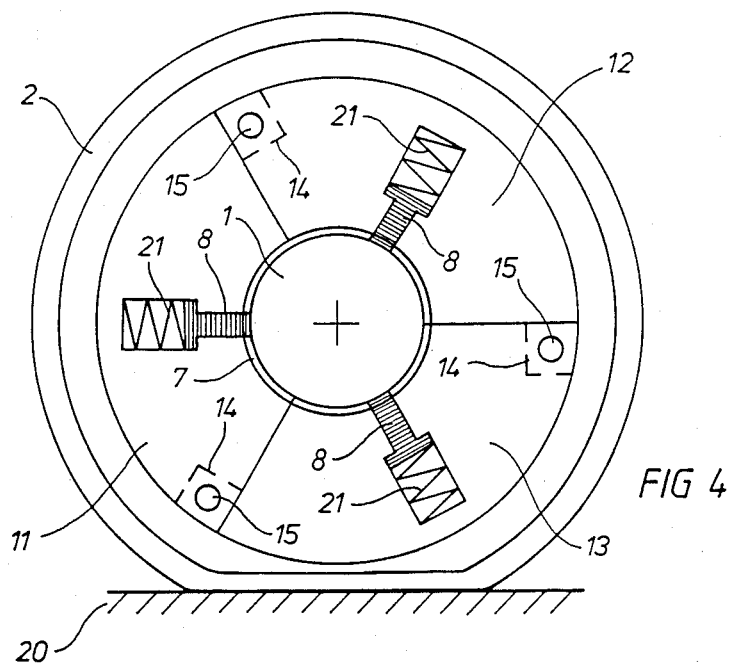
FIG. 4 is a side view of a modified form.

In order to prevent undue inertia resuting from the ample play (7), several resilient centering devices are arranged, as schematically presented in FIG. 4. These are for example spring-loaded central pistons (21), supported in appropriate bearings of the support body, and they evenly distribute the bearing play (7) as presented. Other known methods for centering, or bearings that are free from play, are also usuable.

FIG. 4 shows also by way of example a division of the support body (3) in three segments (11), (12), (13), which are positioned inside the tire (2), and by means of joints (14), which at spaced locations extend into the neighboring segments, they are interconnected by bolts or screws (15).

In this case also, these connector elements are to be considered as merely schematic, and other forms of known connector elements, especially quick grip bindings, are usable, insofar as they are adaptable to the invention.

Figure 5:
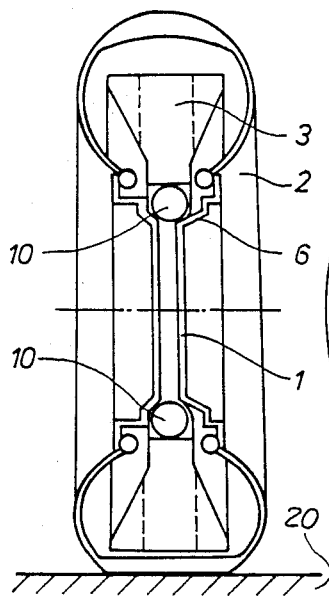
FIG. 5 is an axial sectional view of another modified form.
Figure 6:
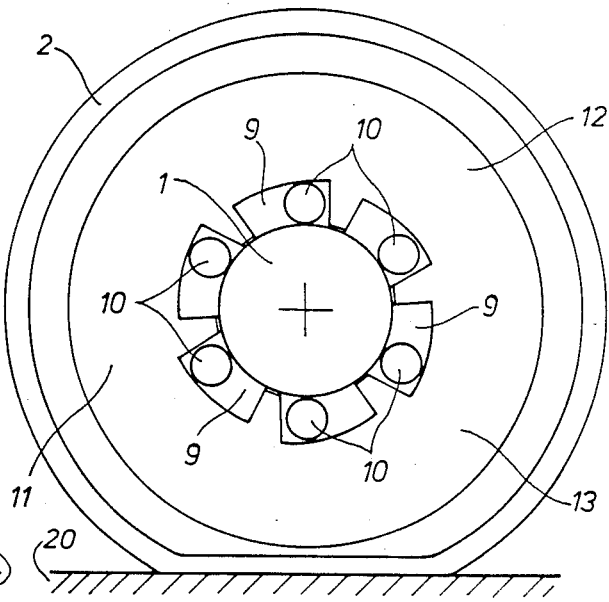
FIG. 6 is a side view of the form of FIG. 5.

FIGS. 5 and 6 show a variation of the invention whereby the bearing of the support body (3) on the rim (1) is made up of ball bearings. To this purpose, balls (10) are introduced into the outer channel (6) of the rim (1) which forms the inner ring, and the support body constitutes the outer ring of this bearing. Other known arrangements of ball cages, etc., as with ball bearings, may be utilized, but these are all to be considered represented by the schematic and simplified presentation illustrated. The use of cylinders or other rollers, such as are appropriate for the form of the outer channel (6) may be utilized.

FIG. 6 shows an example of a secure coupling, wherein the openings (9) for the balls (10) in the support body (3) decrease in radial direction in a turning direction, so that the balls (10) grip and a secure binding ensues, comparable to the old known pedal brakes on a bicycle.

I claim:

1. Safety tire and rim assembly comprising,
   a circular rim having a circumferential surface forming a channel with its concave side directed radially outwardly,
   a circular inflatable elastic tire mounted concentrically on and secured to the rim, the tire having a tread element, the tread element having an outer surface and an inner surface, the inner surface having a predetermined radial dimension when the tire is substantially inflated,
   an annular support body mounted on the rim in rotatable relation thereto, and thereby within the tire, and
   bearing means interposed between the rim and support body and operable for enabling the support body to overrun the rim in one direction only, while preventing it from so overrunning in the other direction.

2. Safety tire and rim assembly according to claim 1 wherein,
   the bearing means includes bearing balls in said channel and confined therein by the support body, the channel thereby forming an inner ring of the bearing means, and the support body forming an outer ring of the bearing means.

3. Safety tire and rim assembly according to claim 2 wherein,
   the support member includes openings respectively receiving the bearing balls, and those openings have radially outer surfaces which, progressing circumferentially of the assembly, change in radial dimension, are operable, in one direction of relative rotation between the rim and support member, for gripping the bearing balls between themselves and the rim, and in the other direction, free running between those members are enabled.

4. Safety tire and rim assembly according to claim 1 wherein,
   an inner surface of the support body is of greater radius than the circumferential surface of the rim, in that portion of the assembly within the diameter projection of said inner surface of the support body.

5. Safety tire and rim assembly according to claim 4 wherein,
   the support body is provided with resilient centering means at circumferentially spaced locations tending to space the support body from the rim in concentric relation therebetween.

6. Safety tire and rim assembly according to claim 1 wherein,
   the support body is made up of a plurality of segments, parted along respective radii, interconnected by disconnectable connecting means.

7. Safety tire and rim assembly according to claim 1 wherein,
   the support body is provided with a relatively high friction elastic material on its peripheral surface.

* * * * *

UNITED STATES PATENT AND TRADEMARK OFFICE
CERTIFICATE OF CORRECTION

PATENT NO. : 4,901,779

DATED : February 20, 1990

INVENTOR(S) : Walter Holzer

It is certified that error appears in the above-identified patent and that said Letters Patent is hereby corrected as shown below:

Col. 1, line 46, "with" should be --without--.

Signed and Sealed this

Twenty-sixth Day of February, 1991

*Attest:*

HARRY F. MANBECK, JR.

*Attesting Officer*      *Commissioner of Patents and Trademarks*